F. HORNQUIST.
SLED.
APPLICATION FILED APR. 3, 1911.

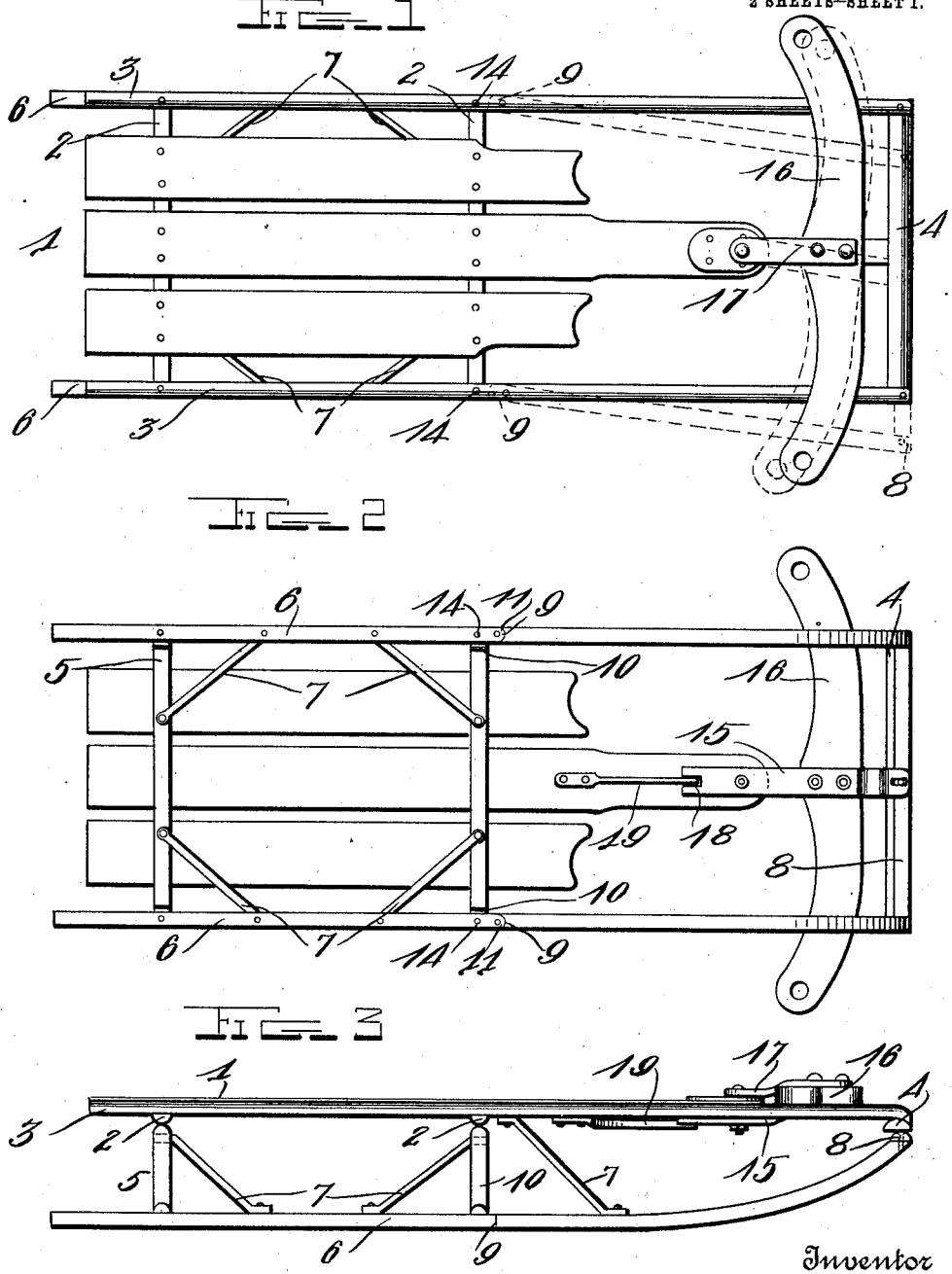

1,003,360.

Patented Sept. 12, 1911.

2 SHEETS—SHEET 2.

Witnesses

Inventor
F. Hornquist
by H. B. Willson &co.
Attorneys

COLUMBIA PLANOGRAPH CO., WASHINGTON, D. C.

UNITED STATES PATENT OFFICE.

FRANK HORNQUIST, OF KANE, PENNSYLVANIA.

SLED.

1,003,360. Specification of Letters Patent. Patented Sept. 12, 1911.

Application filed April 3, 1911. Serial No. 618,532.

*To all whom it may concern:*

Be it known that I, FRANK HORNQUIST, a citizen of the United States, residing at Kane, in the county of McKean and State of Pennsylvania, have invented certain new and useful Improvements in Sleds; and I do declare the following to be a full, clear, and exact description of the invention, such as will enable others skilled in the art to which it appertains to make and use the same.

This invention relates to improvements in sleds.

One object of the invention is to provide a sled having an improved construction of jointed runners whereby the sled may be readily steered.

Another object is to provide an improved construction of steering mechanism whereby the jointed runners of the sled may be readily actuated to steer the sled in the desired direction and having means whereby the steering mechanism will be yieldingly held against turning when the sled is being drawn along.

With these and other objects in view, the invention consists of certain novel features of construction, combination and arrangement of parts as will be more fully described and particularly pointed out in the appended claims.

Figure 4:
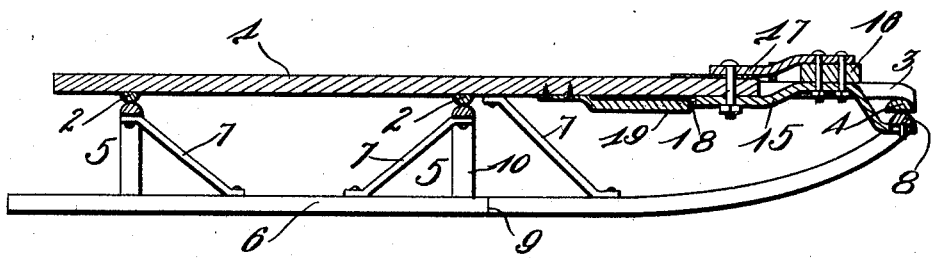
Figure 5:
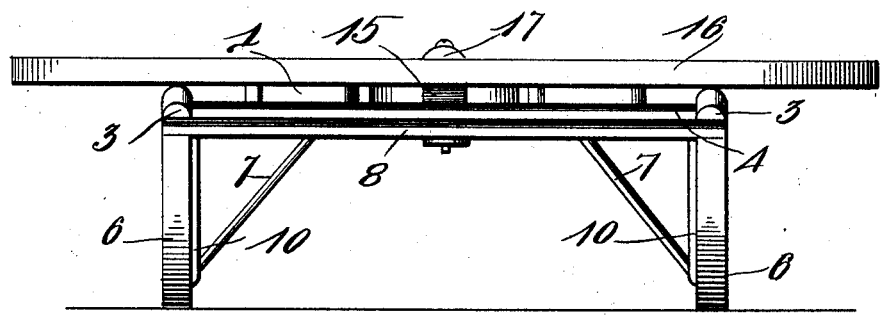
Figure 6:
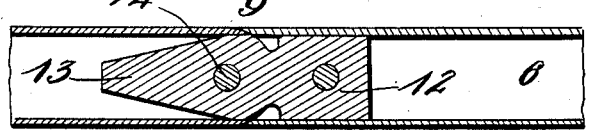
Figure 7:
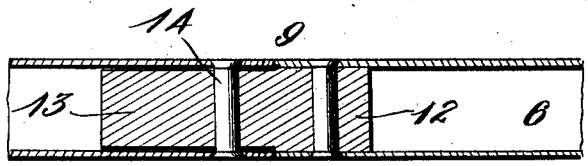

In the accompanying drawings: Figure 1 is a top plan view of a sled constructed in accordance with my invention, showing in dotted lines the manner in which the sled is steered; Fig. 2 is a bottom plan view of the same; Fig. 3 is a side elevation; Fig. 4 is a central vertical longitudinal sectional view; Fig. 5 is a front end view; Fig. 6 is an enlarged horizontal sectional view of a portion of one of the runners showing the construction of the joint; Fig. 7 is a vertical sectional view of the same parts.

Referring more particularly to the drawings, 1 denotes the top or seat of the sled the same being here shown in the form of a series of slats secured to cross bars 2, the ends of which are secured to longitudinal side bars 3, the forward ends of which are riveted or otherwise secured to an upper front cross bar 4.

To the outer ends of the cross bars 4 are secured runner frames 5 to the lower ends of which are secured the runners 6, said runners being also secured to the frames 5 and side bars 3 by inclined brace bars 7. The forward ends of the runners are curved upwardly in the usual manner and said upwardly curved ends are riveted or otherwise secured to a lower front cross bar 8. The lower front cross bar 8 has a lateral sliding engagement with the upper front cross bar 4. The runners 6 are here shown as being constructed of rectangular tubing and have formed therein one or more joints 9, one of which is shown in the present instance. The joint 9 in the runners is shown as being located adjacent to the front posts 10 and said joint is formed by providing the upper and lower sides of the inner ends of the front sections of the runners with curved recesses and the upper and lower sides of the adjacent ends of the rear sections with curved or rounded projections 11. In the joint ends of the front sections of the runner are riveted or otherwise secured joint blocks 12 the outer ends 13 of which are tapered or V-shaped and project into the adjoining ends of the rear sections of the runners and are pivotally connected to said ends by pivot pins or rivets 14. While I have herein shown and described the runners as being of rectangular tubular construction I do not wish to limit the runners to this construction as it is obvious that the same may be of tubular cylindrical construction or made solid and in any suitable shape. By providing a joint constructed as herein shown and described the outer surface of the edges of the same will be flush and smooth and will readily pass over any obstructions.

The central slat of the top or seat of the sled extends beyond the forward end of side slats and to said projecting end of the central slat is pivotally connected the inner end of a connecting bar 15 the outer end of which is pivotally connected to the front lower cross bar 8. To the connecting bar 15 is secured a transversely disposed steering bar 16 the outer ends of which project over and beyond the side bars 3 of the sled. The steering bar 16 is braced by a short connecting bar 17, rigidly secured at its forward end to the upper side of the steering bar 16 and at its rear end is pivotally connected to the forward end of the central slat of the sled seat. By thus rigidly connecting the steering bar to the connecting bar 15 and pivotally connecting the latter to the seat of the sled and to the cross bar of the jointed sections of the runners it will be obvious that by pressing one end or the other of the steering bar either by the hands or feet that the front pivoted sections of the runners may be readily turned in either direction thereby steering the sled.

In order to yieldingly hold the pivoted front ends of the runners against turning as when drawing the sled with a rope, I preferably extend the inner end of the connecting bar 15 back beyond its pivotal connection with the under side of the central slat of the seat and forming in said extended end a notch 18 with which is adapted to be engaged a spring detent 19 as clearly shown in Fig. 2 of the drawing. The spring detent 19 while holding the pivoted ends of the runners against casual turning is not sufficiently stiff to interfere with the steering operation of the runners by the hands or feet of the person on the sled.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

Having thus described my invention, what I claim is:

1. A sled having jointed runners, a cross bar connecting the jointed ends of the runners, a connecting bar to connect said cross bar with the seat of the sled, a spring adapted to engage the inner end of said connecting bar whereby the jointed ends of the runners are yieldingly held against turning and a steering bar secured to said connecting bar whereby said jointed ends of the runners are manually turned against the pressure of said spring to steer the sled.

2. A sled having a top comprising rear cross bars, longitudinal side bars and a seat portion, a front cross bar connecting the front ends of said side bars, jointed runner frames connected to said rear cross bars, runners connected to said frames, a front cross bar connecting the front ends of the runners and having a sliding engagement with the front cross bar of the sled top, a connecting bar to pivotally connect the cross bar of the runners with said top, a spring adapted to engage the inner end of said connecting bar whereby the jointed ends of the runners are yieldingly held against turning, a steering bar secured to said connecting bar whereby said jointed ends of the runners are manually turned against the pressure of said spring to steer the sled, and a brace bar rigidly connected to said steering bar and pivotally connected to the top of the sled.

3. A sled having hollow runners formed in jointed sections the inner ends of the forward sections of the runners being provided with curved recesses, rounded projections formed on the inner ends of the rear sections of the runners and adapted to engage said recessed ends of the forward sections, and a joint block rigidly secured in the inner ends of the front runner sections and having a tapered end projecting into the inner ends of the rear sections and means to pivotally connect said ends of the rear runner sections to the tapered ends of said blocks.

In testimony whereof I have hereunto set my hand in presence of two subscribing witnesses.

FRANK HORNQUIST.

Witnesses:
F. J. Woods,
T. J. Tuohy.

Copies of this patent may be obtained for five cents each, by addressing the "Commissioner of Patents, Washington, D. C."